(No Model.)

A. W. STOKES.
PIPETTE.

No. 605,146.   Patented June 7, 1898.

Witnesses:
B. S. Ober.
Henry Orth

Inventor.
Alfred Walter Stokes
by Henry Orth
Atty

THE NORRIS PETERS CO., PHOTO-LITHO., WASHINGTON, D. C.

UNITED STATES PATENT OFFICE.

ALFRED WALTER STOKES, OF LONDON, ENGLAND, ASSIGNOR TO R. A. LISTER & CO., LIMITED, OF DURSLEY, ENGLAND.

PIPETTE.

SPECIFICATION forming part of Letters Patent No. 605,146, dated June 7, 1898.

Application filed October 27, 1897. Serial No. 656,565. (No model.)

*To all whom it may concern:*

Be it known that I, ALFRED WALTER STOKES, F. C. S., F. I. C., a subject of the Queen of Great Britain and Ireland, and a resident of 60 Parkhill road, Haverstock Hill, London, England, have invented a certain new and useful Pipette for Automatically Measuring off Small Quantities of Liquid, of which the following is a specification.

The apparatus may be said to consist of an ordinary short-nosed glass pipette, terminating at the upper limit of the chamber, which is adapted to contain the quantity of liquid to be measured off. At this place a conical valve-seat is provided for a plug or valve to fit it. The valve has a stem, rod, or lever for operating it by, and is by preference provided with a helical or other spring for holding the valve open or shut.

Figure 1:
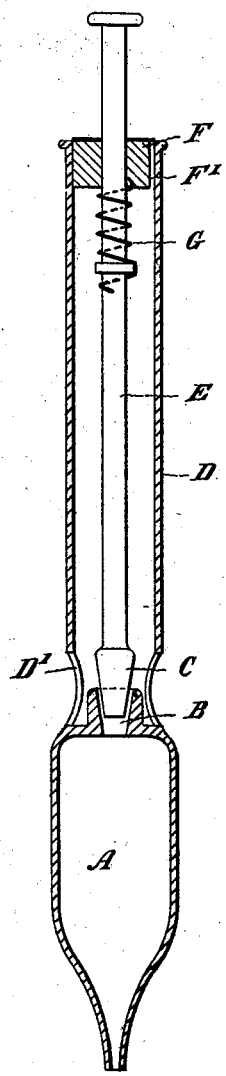
Figure 2:
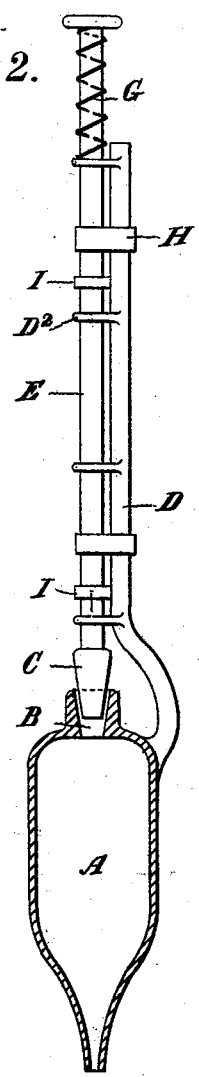

Figure 1 is a longitudinal section of one form of this pipette. Fig. 2 is a like section of another form, and Fig. 3 a plan section.

A, Fig. 1, is the chamber for containing the quantity of liquid to be measured off at one operation. In its upper part it is provided with a conical valve-seat B for the valve C to fit. The chamber A is continued up into a tube D, which surrounds the stem E of the valve. The upper end of this stem passes out through a cork F in the upper end of the tube D for guiding the stem. The tube D has at its lower end two or more lateral openings D'. The helical spring G, attached to the stem E and the cork F, tends to pull the valve out of its seat.

F' is a small vent or passage in the cork.

Figure 3:
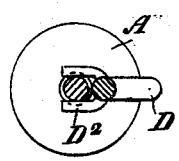

In Figs. 2 and 3 the valve-stem E is not surrounded by a tube, but guided between forks D² on a rod D, which proceeds from the top of the chamber A, the stem being held up to the rod D by rubber bands H. The rubber rings I hold them elastically at a slight distance apart to preserve the rod D from breaking, all the parts being of glass.

When the pipette is placed in a vessel containing enough liquid to cover it, it will fill from below, the air passing out through the lateral openings D', Fig. 1. By depressing the valve-stem E with a finger the valve C is brought into its seat and the pipette can in this condition be raised out of the liquid, any surplus liquid above the valve having first been allowed to flow out through the openings D'. The pipette is brought over the vessel to be charged and the finger-pressure taken off the valve-stem, whereupon the valve will be opened by the spring and the air entering the valve (by the openings D' in the form Fig. 1) will allow the measure of liquid in the chamber A to be discharged. By a reverse arrangement the spring may be adapted to hold the valve down in its seat, and the stem E would then have to be raised against the pressure of the spring while filling and also while emptying.

Having now described my invention, what I claim as new, and desire to secure by Letters Patent, is—

1. A pipette consisting of a measuring-chamber, a valve-seat in the upper end thereof, a continuation above the measuring-chamber and a valve and stem guided in said continuation, for the purpose set forth.

2. A pipette consisting of a measuring-chamber, a valve-seat in the upper end thereof, a continuation above the measuring-chamber, a valve and stem guided in said continuation, and means for holding said valve normally open, for the purpose set forth.

3. A pipette consisting of a measuring-chamber provided with a valve-seat in its upper part, and having an upper cylindrical continuation, a valve therefor and a valve-stem guided in the upper end of the said cylindrical continuation, substantially as set forth.

4. A pipette consisting of the measuring-chamber A, with continuation-tube D having openings D' and provided with valve-seat B, the valve C with stem E, the latter guided in the upper end of the tube D, and a spring G for holding the valve open, substantially as set forth.

ALFRED WALTER STOKES.

Witnesses:
 V. JENSEN,
 FRED C. HARRIS.